United States Patent
Lin et al.

(10) Patent No.: US 11,902,116 B2
(45) Date of Patent: Feb. 13, 2024

(54) PACKET PROCESSING METHOD, FORWARDING PLANE DEVICE AND NETWORK DEVICE

(71) Applicant: Huawei Technologies Co., Ltd., Shenzhen (CN)

(72) Inventors: Chengyong Lin, Shenzhen (CN); Enhui Liu, Shenzhen (CN); Wenyang Lei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/146,777

(22) Filed: Dec. 27, 2022

(65) Prior Publication Data

US 2023/0216754 A1 Jul. 6, 2023

Related U.S. Application Data

(63) Continuation of application No. 16/984,731, filed on Aug. 4, 2020, now Pat. No. 11,552,863, which is a
(Continued)

(51) Int. Cl.
*H04L 41/50* (2022.01)
*H04L 49/00* (2022.01)
(Continued)

(52) U.S. Cl.
CPC ...... *H04L 41/5077* (2013.01); *H04L 41/5041* (2013.01); *H04L 45/74* (2013.01);
(Continued)

(58) Field of Classification Search
CPC . H04L 41/5077; H04L 41/5041; H04L 45/74; H04L 45/745; H04L 49/00;
(Continued)

(56) References Cited

U.S. PATENT DOCUMENTS 6,735,169 B1 5/2004 Albert et al.
8,050,275 B1 11/2011 Iyer
(Continued)

FOREIGN PATENT DOCUMENTS

| CN | 101060423 A | 10/2007 |
|---|---|---|
| CN | 101505278 A | 8/2009 |

(Continued)

OTHER PUBLICATIONS

"OpenFlow Switch Specification," XP002694270, Version 1.3.1, Sep. 6, 2012, 128 pages.
(Continued)

*Primary Examiner* — Kwang B Yao
*Assistant Examiner* — Syed M Bokhari
(74) *Attorney, Agent, or Firm* — Conley Rose, P.C.

(57) ABSTRACT

A packet processing method includes receiving, by a forwarding plane device, a first packet transmitted by a user, where an identity of the user is comprised in the first packet, and a forwarding table is comprised in the forwarding plane device, determining, by the forwarding plane device, an identity of a service according to a corresponding relationship between the identity of the user and the identity of the service as well as the identity of the user in the first packet, generating, by the forwarding plane device, a second packet by encapsulating the first packet with the identity of the service, and transmitting the second packet to a network device to enable the network device to manage the service according to the identity of the service in the second packet.

18 Claims, 6 Drawing Sheets

Related U.S. Application Data continuation of application No. 16/042,710, filed on Jul. 23, 2018, now Pat. No. 10,771,356, which is a continuation of application No. 14/707,752, filed on May 8, 2015, now Pat. No. 10,044,574, which is a continuation of application No. PCT/CN2012/084368, filed on Nov. 9, 2012.

(51) Int. Cl.

| | | |
|---|---|---|
| *H04L 9/40* | (2022.01) | |
| *H04L 41/5041* | (2022.01) | |
| *H04L 61/5007* | (2022.01) | |
| *H04L 45/74* | (2022.01) | |
| *H04L 45/745* | (2022.01) | |
| *H04L 45/64* | (2022.01) | |
| *H04L 45/00* | (2022.01) | |

(52) U.S. Cl.
CPC ............ *H04L 45/745* (2013.01); *H04L 49/00* (2013.01); *H04L 61/5007* (2022.05); *H04L 63/0263* (2013.01); *H04L 63/10* (2013.01); *H04L 45/38* (2013.01); *H04L 45/64* (2013.01)

(58) Field of Classification Search
CPC . H04L 61/5007; H04L 63/0263; H04L 63/10; H04L 45/38; H04L 45/64
USPC ......................................................... 370/392
See application file for complete search history.

(56) References Cited

U.S. PATENT DOCUMENTS

| | | | | |
|---|---|---|---|---|
| 8,339,959 | B1* | 12/2012 | Moisand | ............... H04L 45/302 370/235 |
| 8,701,179 | B1* | 4/2014 | Penno | ..................... H04L 63/02 709/227 |
| 2005/0086328 | A1 | 4/2005 | Landram et al. | |
| 2008/0049614 | A1 | 2/2008 | Briscoe et al. | |
| 2008/0201478 | A1 | 8/2008 | Yao et al. | |
| 2010/0215050 | A1 | 8/2010 | Kanada | |
| 2011/0106925 | A1* | 5/2011 | Vogt | ..................... H04W 76/11 709/230 |
| 2012/0177051 | A1 | 7/2012 | Yu | |
| 2012/0254353 | A1 | 10/2012 | Baba et al. | |
| 2014/0298410 | A1 | 10/2014 | Agarwal et al. | |

FOREIGN PATENT DOCUMENTS

| | | | |
|---|---|---|---|
| CN | 101729308 A | 6/2010 | |
| CN | 102217251 A | 10/2011 | |
| EP | 2 469 945 A1 * | 6/2012 | |
| EP | 2469945 A1 * | 6/2012 | ....... H04L 29/12028 |

OTHER PUBLICATIONS

McKeown, N., et al., "OpenFlow: Enabling Innovation in Campus Networks," XP055091294, ACM SIGCOMM Computer Communication Review, vol. 38, No. 2, Apr. 2008, 6 pages.

Matias, J., et al., "The UPV/EHU OpenFlow Enabled Facility," XP055217392, EU FP7 projects OFELIA and Change, Sep. 9, 2011, 2 pages.

RFC 2516, L. Mamakos et al, "A Method for Transmitting PPP Over Ethernet (PPPoE)," Feb. 1999, 17 pages.

* cited by examiner receiving, by a network device, a second packet transmitted by a forwarding plane device, where the second packet is obtained from a following pathway: receiving, by the forwarding plane device, a first packet transmitted by a user, where an identity of the user is included in the first packet, and a forwarding table is included in the forwarding plane device; determining, by the forwarding plane device, an identity of a service according to a corresponding relationship between the identity of the user and the identity of the service as well as the identity of the user in the first packet; generating, by the forwarding plane device, the second packet by encapsulating the first packet with the identity of the service; transmitting, by the forwarding plane device, the second packet to the network device ⎯ 301 managing, by the network device, the service according to the identity of the service in the second packet ⎯ 302

FIG. 3 receiving, by a network device, a first packet forwarded by a forwarding plane device, where the first packet is obtained from a following pathway: receiving, by the forwarding plane device, the first packet transmitted by a user, where an identity of the user is included in the first packet, and a forwarding table is included in the forwarding plane device; forwarding, by the forwarding plane device, the first packet to a control plane device ⎯ 401 determining, by the network device, an identity of a service according to a corresponding relationship between the identity of the user and the identity of the service as well as the identity of the user in the first packet ⎯ 402 managing, by the network device, the service according to the identity of the service ⎯ 403

FIG. 4

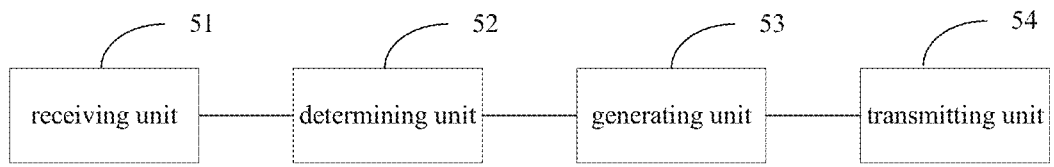

FIG. 5

PACKET PROCESSING METHOD, FORWARDING PLANE DEVICE AND NETWORK DEVICE

CROSS-REFERENCE TO RELATED APPLICATIONS

This is a continuation of U.S. patent application Ser. No. 16/984,731 filed on Aug. 4, 2020, now U.S. Pat. No. 11,552,863, which is a continuation of U.S. patent application Ser. No. 16/042,710 filed on Jul. 23, 2018, now U.S. Pat. No. 10,771,356, which is a continuation of U.S. patent application Ser. No. 14/707,752 filed on May 8, 2015, now U.S. Pat. No. 10,044,574, which is a continuation of International Patent Application No. PCT/CN2012/084368 filed on Nov. 9, 2012. All of the aforementioned applications are hereby incorporated by reference in their entireties.

TECHNICAL FIELD

The present disclosure relates to network techniques and, in particular, to a packet processing method, a forwarding plane device and a network device.

BACKGROUND

With the development of network techniques, a separation between control and forwarding has been implemented in an existing software define network (SDN). For example, a controller can generate a forwarding table, and send the forwarding table to a broadband remote access server (BRAS) or a service router (SR). The BRAS or the SR can forward a received packet according to the forwarding table. Management of services is not flexible enough in other approaches.

SUMMARY

Embodiments of the present disclosure provide a packet processing method and device, a forwarding plane device and a network device, which are used to improve the flexibility of management of services.

In order to achieve the purposes described above, embodiments of the present disclosure disclose the following technical solutions.

In a first aspect, a packet processing method is provided, including receiving, by a forwarding plane device, a first packet transmitted by a user, where an identity of the user is included in the first packet, and a forwarding table is included in the forwarding plane device, determining, by the forwarding plane device, an identity of a service according to a corresponding relationship between the identity of the user and the identity of the service as well as the identity of the user in the first packet, generating, by the forwarding plane device, a second packet by encapsulating the first packet with the identity of the service, and transmitting, by the forwarding plane device, the second packet to a network device, where the second packet is used to enable the network device to manage the service according to the identity of the service in the second packet.

In a first possible implementation of the first aspect, managing the service by the network device according to the identity of the service in the second packet includes performing, by the network device, an operation corresponding to the service to the second packet according to the identity of the service in the second packet, where the network device is a first server capable of performing the service, forwarding, by the network device, the second packet to a second server capable of performing the service according to the identity of the service in the second packet, or generating, by the network device, a forwarding table entry according to the identity of the service in the second packet, and transmitting the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

With reference to the first aspect or the first possible implementation of the first aspect, in a second possible implementation, after the forwarding plane device receives the first packet transmitted by the user, the method further includes performing, by the forwarding plane device, a user management operation to the user according to the identity of the user in the first packet.

In a second aspect, a packet processing method is provided, including receiving, by a forwarding plane device, a first packet transmitted by a user, where an identity of the user is included in the first packet, and a forwarding table is included in the forwarding plane device, and forwarding, by the forwarding plane device, the first packet to a network device, where the first packet is used to enable the network device to determine an identity of a service according to a corresponding relationship between the identity of the user and the identity of the service as well as the identity of the user in the first packet, and manage the service according to the identity of the service.

In a first possible implementation of the second aspect, managing the service according to the identity of the service includes performing, by the network device, an operation corresponding to the service to the first packet according to the identity of the service, where the network device is a first server capable of performing the service, generating, by the network device, a second packet by encapsulating the first packet with the identity of the service, forwarding, by the network device, the second packet to a second server, where the second server is capable of performing the service, or generating, by the network device, a forwarding table entry according to the identity of the service, and transmitting the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

With reference to the second aspect or the first possible implementation of the second aspect, in a second possible implementation, after the forwarding plane device receives the first packet transmitted by the user, the method further includes performing, by the forwarding plane device, a user management operation to the user according to the identity of the user in the first packet.

In a third aspect, a packet processing method is provided, including receiving, by a network device, a second packet transmitted by a forwarding plane device, where the second packet is obtained through receiving, by the forwarding plane device, a first packet transmitted by a user, where an identity of the user is included in the first packet, and a forwarding table is included in the forwarding plane device, determining, by the forwarding plane device, an identity of a service according to a corresponding relationship between the identity of the user and the identity of the service as well as the identity of the user in the first packet, generating, by the forwarding plane device, the second packet by encapsulating the first packet with the identity of the service, transmitting, by the forwarding plane device, the second packet to the network device, and managing, by the network device, the service according to the identity of the service in the second packet.

In a first possible implementation of the third aspect, managing the service by the network device according to the identity of the service in the second packet includes performing, by the network device, an operation corresponding to the service to the second packet according to the identity of the service in the second packet, where the network device is a first server capable of performing the service, forwarding, by the network device, the second packet to a second server capable of performing the service according to the identity of the service in the second packet, or generating, by the network device, a forwarding table entry according to the identity of the service in the second packet, and transmitting the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

In a fourth aspect, a packet processing method is provided, including receiving, by a network device, a first packet forwarded by a forwarding plane device, where the first packet is obtained through receiving, by the forwarding plane device, the first packet transmitted by a user, where an identity of the user is included in the first packet, and a forwarding table is included in the forwarding plane device, forwarding, by the forwarding plane device, the first packet to a control plane device, determining, by the network device, an identity of a service according to a corresponding relationship between the identity of the user and the identity of the service as well as the identity of the user in the first packet, and managing, by the network device, the service according to the identity of the service.

In a first possible implementation of the fourth aspect, managing the service by the network device according to the identity of the service includes performing, by the network device, an operation corresponding to the service to the first packet according to the identity of the service, where the network device is a first server capable of performing the service, generating, by the network device, a second packet by encapsulating the first packet with the identity of the service, forwarding, by the network device, the second packet to a second server, where the second server is capable of performing the service, or generating, by the network device, a forwarding table entry according to the identity of the service, and transmitting the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

In a fifth aspect, a forwarding plane device is provided, including a receiving unit configured to receive a first packet transmitted by a user, where an identity of the user is included in the first packet, and a forwarding table is included in the forwarding plane device, a determining unit configured to determine an identity of a service according to a corresponding relationship between the identity of the user and the identity of the service as well as the identity of the user in the first packet received by the receiving unit, a generating unit configured to generate a second packet by encapsulating the first packet with the identity of the service determined by the determining unit, a transmitting unit configured to transmit the second packet generated by the generating unit to a network device, where the second packet is used to enable the network device to manage the service according to the identity of the service in the second packet.

In a first possible implementation of the fifth aspect, including an operating unit configured to perform a user management operation to the user according to the identity of the user in the first packet received by the receiving unit.

In a sixth aspect, a forwarding plane device is provided, including a receiving unit configured to receive a packet transmitted by a user, where an identity of the user is included in the packet, and a forwarding table is included in the forwarding plane device, and a forwarding unit configured to forward the packet received by the receiving unit to a network device, where the packet is used to enable the network device to determine an identity of a service according to a corresponding relationship between the identity of the user and the identity of the service as well as the identity of the user in the packet, and manage the service according to the identity of the service.

In a first possible implementation of the sixth aspect, further including an operating unit configured to perform a user management operation to the user according to the identity of the user in the packet received by the receiving unit.

In a seventh aspect, a network device is provided, including a receiving unit configured to receive a second packet transmitted by a forwarding plane device, where the second packet is obtained through receiving, by the forwarding plane device, a first packet transmitted by a user, where an identity of the user is included in the first packet, and a forwarding table is included in the forwarding plane device, determining, by the forwarding plane device, an identity of a service according to a corresponding relationship between the identity of the user and the identity of the service as well as the identity of the user in the first packet, generating the second packet by encapsulating the first packet with the identity of the service, transmitting, by the forwarding plane device, the second packet to the network device, and a managing unit configured to manage the service according to the identity of the service in the second packet.

In a first possible implementation of the seventh aspect, the managing unit is configured to perform an operation corresponding to the service to the second packet according to the identity of the service in the second packet, and the network device is a first server capable of performing the service, forward the second packet to a second server capable of performing the service according to the identity of the service in the second packet, or generate a forwarding table entry according to the identity of the service in the second packet, and transmit the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

In an eighth aspect, a network device is provided, including a receiving unit configured to receive a first packet forwarded by a forwarding plane device, where the first packet is obtained through receiving, by the forwarding plane device, the first packet transmitted by a user, where an identity of the user is included in the first packet, and a forwarding table is included in the forwarding plane device, forwarding, by the forwarding plane device, the first packet to the network device, a determining unit configured to determine an identity of a service according to a corresponding relationship between the identity of the user and the identity of the service as well as the identity of the user in the first packet, and a managing unit configured to manage the service according to the identity of the service determined by the determining unit.

In a first possible implementation of the eighth aspect, the managing unit is further configured to perform an operation corresponding to the service to the packet according to the identity of the service, and the network device is a first server capable of performing the service, generate a second packet by encapsulating the first packet with the identity of the service, or generate a forwarding table entry according to the identity of the service, and transmit the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

It may be seen from the technical solutions described above that a forwarding plane device performs an encapsulation to a first packet to generate a second packet. An identity of a service is included in the second packet. The forwarding plane device forwards the second packet to a network device such that the network device can manage the service according to the identity of the service in the second packet. The technical solutions above may be used to improve the flexibility of management which is performed to the service.

BRIEF DESCRIPTION OF DRAWINGS

In order to make technical solutions in embodiments of the present disclosure or the other approaches more clearly, accompanying drawings used in the description of the embodiments or the other approaches will be briefly described hereunder. Obviously, the described drawings are merely some embodiments of present disclosure. For persons skilled in the art, other drawings may be obtained based on these drawings.

FIG. 3 is a flow chart of a packet processing method according to an embodiment of the present disclosure;

FIG. 4 is a flow chart of a packet processing method according to an embodiment of the present disclosure;

FIG. 5 is a schematic structural diagram of a forwarding plane device according to an embodiment of the present disclosure;

DESCRIPTION OF EMBODIMENTS

Technical solutions in embodiments of the present disclosure are hereinafter described clearly with reference to accompanying drawings in embodiments of the present disclosure. The described embodiments are only a part of embodiments of the present disclosure, rather than all embodiments of the present disclosure. All other embodiments obtained by persons of ordinary skill in the art based on embodiments of the present disclosure shall fall within the protection scope of the present disclosure.

Figure 1:
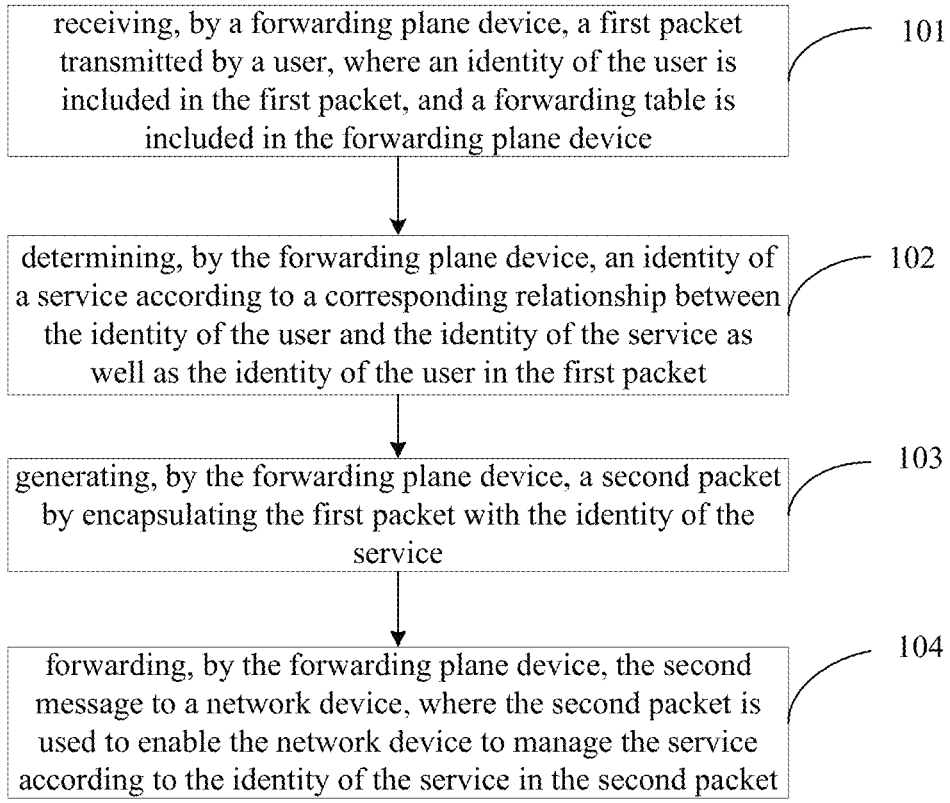
FIG. 1 is a flow chart of a packet processing method according to an embodiment of the present disclosure.

FIG. 1 is a flow chart of a packet processing method according to an embodiment of the present disclosure. With reference to FIG. 1, the method includes the following steps.

Step 101: Receiving, by a forwarding plane device, a first packet transmitted by a user, where an identity of the user is included in the first packet, and a forwarding table is included in the forwarding plane device.

The forwarding plane device is a device for forwarding traffic. For example, the forwarding plane device may be a BRAS.

The user may be a device located in a local area network. For example, the user may be a personal computer located in a home network. The personal computer may access to internet via a point-to-point protocol over Ethernet (PPPoE).

The first packet may be an Internet Protocol (IP) packet. For example, the IP may be IP version 4 (IPv4), and may also be IP version 6 (IPv6).

The identity of the user is used to identify the user. For example, the identity of the user may be a media access control (MAC) protocol address of the user, and may also be an IP address of the user. The identity of the user may also be a combination of the MAC protocol address of the user and a virtual local area network (VLAN) identity of the user.

For example, the forwarding table may be a flow table, and may also be a packet forwarding table.

The forwarding plane device may have two forwarding modes, of which one is a flow forwarding mode, and the other is a packet forwarding mode.

The flow forwarding refers to that the forwarding plane device forwards a packet according to a flow table. The number of fields in an entry of the flow table, which are used for judging whether the packet is matched with the entry of the flow table, is two or more than two. For example, the number of fields in an entry of the flow table, which are used for judging whether the packet is matched with the entry of the flow table, may be 5. The 5 fields may be an IP address, a destination IP address, a source port, a destination port and a protocol respectively. For example, the fields used for judging whether the packet is matched with the entry of the flow table may be fields in a data link layer of an open systems interconnection model (OSI model), and may also be fields in an IP layer of the OSI model.

The packet forwarding refers to that the forwarding plane device forwards a packet according to a packet forwarding table. The number of field in an entry of the packet forwarding table, which is used for judging whether the packet is matched with the entry of the packet forwarding table, is 1. For example, the field in an entry of the packet forwarding table, which is used for judging whether the packet is matched with the entry of the packet forwarding table, may be the destination IP address, and may also be a destination MAC protocol address. Persons skilled in the art can understand that, the packet forwarding table may be an MAC table, and may also be a route table.

Persons skilled in the art can understand that the forwarding plane device may be a switch or a router.

If the forwarding plane device is a switch, the forwarding plane device may be an OPENFLOW switch. For the OPENFLOW switch, reference may be made to OPENFLOW SWITCH SPECIFICATION version 1.0 issued by Standard Setting Organization (SSO) Open Networking Foundation (ONF).

Step 102: Determining, by the forwarding plane device, an identity of a service according to a corresponding relationship between the identity of the user and the identity of the service as well as the identity of the user in the first packet.

The service refers to processing a received packet according to fields in the received packet. The fields in the packet may be information from a second layer to a seventh layer as defined by the OSI model.

For example, the service may be a network address translation (NAT) service, a carrier grade NAT (CGN) service, an IP security (IPSEC) service, a video service, a firewall service, a uniform/universal resource locator (URL) filtering service, a peer-to-peer (P2P) traffic virtualization service. The video service may be a frame relay (FR), resolution enhancement technology (RET), a multiple document interface (MDI) or a content delivery network (CDN).

For example, the service may be a forwarding service or a committed access rate (CAR) service. If the service is a forwarding service, the forwarding service may be a layer 2 forwarding service, a layer 3 forwarding service, a multi-protocol label switching (MPLS) forwarding service or a virtual private network (VPN) forwarding service.

For example, the corresponding relationship may be saved in an authentication, authorization and accounting (AAA) server. The forwarding plane device may acquire the corresponding relationship from the AAA server. For example, the forwarding plane device may acquire the corresponding relationship from the AAA server via a remote authentication dial in user service (Radius) protocol.

The identity of the service is used to identify the service.

Step 103: Generating, by the forwarding plane device, a second packet by encapsulating the first packet with the identity of the service.

The second packet includes the identity of the service. The identity of the service may be carried in payload of the second packet, and may also be carried in a packet header of the second packet.

Step 104: Forwarding, by the forwarding plane device, the second packet to a network device, where the second packet is used to enable the network device to manage the service according to the identity of the service in the second packet.

The network device may be a control plane device corresponding to the forwarding plane device. The network device may also be a device for forwarding traffic. For example, the network device may be a router. The network device may also be a service server which can process the service.

It can be seen from the technical solutions described above that the forwarding plane device generates a second packet by encapsulating the first packet. The identity of the service is included in the second packet. The forwarding plane device forwards the second packet to the network device such that the network device can manage the service according to the identity of the service in the second packet. The technical solutions above can be used to improve the flexibility of management of the service.

Alternatively, in the method as shown in FIG. 1, the managing the service by the network device according to the identity of the service in the second packet may include performing, by the network device, an operation corresponding to the service to the second packet according to the identity of the service in the second packet, where the network device is a first server capable of performing the service.

For example, if the service is an NAT service, the first server may be a CGN device.

For example, if the service is a committed access rate (CAR) service, the first server may be a router capable of performing an operation corresponding to the CAR service.

For example, if the service is a video enhancement service, the first server may be a switch capable of performing an operation corresponding to the video enhancement service.

Alternatively, in the method as shown in FIG. 1, managing the service by the network device according to the identity of the service in the second packet may include forwarding, by the network device, the second packet to a second server capable of performing the service according to the identity of the service in the second packet.

The network device is a device capable of forwarding traffic. For example, the network device may be a router. The network device may also be a neighboring forwarding plane device of the forwarding plane device. The network device may be a control plane device, or a neighboring control plane device of the control plane device.

Alternatively, in the method as shown in FIG. 1, managing the service by the network device according to the identity of the service in the second packet includes generating, by the network device, a forwarding table entry according to the identity of the service in the second packet, and transmitting the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

In the technical solutions above, the service may be a forwarding service.

The network device may be a control plane device. During a specific implementation, the network device may be an OPENFLOW controller. For the OPENFLOW controller, reference may be made to OPENFLOW SWITCH SPECIFICATION version 1.0 issued by the ONF.

The forwarding plane device may communicate with the network device via a control channel. The control channel may be a secure channel in which interactions are performed between the OPENFLOW switch and the OPENFLOW controller. For the secure channel, reference may be made to OPENFLOW SWITCH SPECIFICATION version 1.0 issued by the ONF.

Alternatively, in the method as shown in FIG. 1, after the forwarding plane device receives the first packet transmitted by the user, the method may further include performing, by the forwarding plane device, a user management operation to the user according to the identity of the user in the first packet.

The user management may be management which is performed to an on-line process of the user. For example, the user management may be assigning an IP address for the user, authenticating the user, or authorizing the user.

In the technical solutions above, the forwarding plane device performs a user management operation to the user, and the forwarding plane device does not perform a service management operation to the user. Thus, the technical solutions above realize a separation between the user management and the service management.

Figure 2:
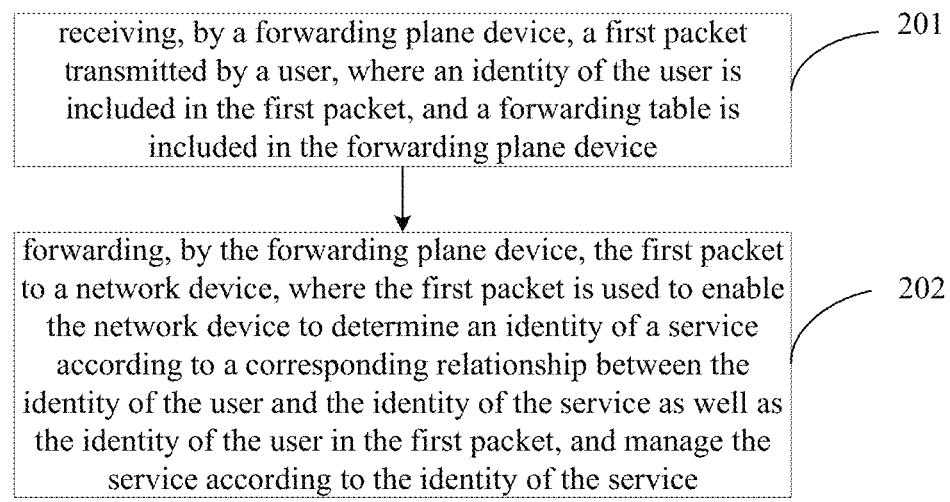
FIG. 2 is a flow chart of a packet processing method according to an embodiment of the present disclosure.

With reference to FIG. 2, embodiments of the present disclosure provide a packet processing method. The method includes the following steps.

Step 201: Receiving, by a forwarding plane device, a first packet transmitted by a user, where an identity of the user is included in the first packet, and a forwarding table is included in the forwarding plane device.

The forwarding plane device is a device for forwarding traffic. For example, the forwarding plane device may be a BRAS.

The user may be a device located in a local area network. For example, the user may be a personal computer located in a home network. The personal computer may access to Internet via a PPPoE.

The first packet may be an IP packet. For example, the IP may be IPv4, and may also be IPv6.

The identity of the user is used to identify the user. For example, the identity of the user may be an MAC protocol address of the user, and may also be an IP address of the user. The identity of the user may also be a combination of the MAC protocol address of the user and a VLAN identity of the user.

For example, the forwarding table may be a flow table, and may also be a packet forwarding table.

The forwarding plane device may have two forwarding modes, of which one is a flow forwarding mode, the other is a packet forwarding mode.

The flow forwarding refers to that the forwarding plane device forwards a packet according to a flow table. The number of fields in an entry of the flow table, which are used for judging whether the packet is matched with the entry of the flow table, is two or more than two. For example, the number of fields in an entry of the flow table, which are used for judging whether the packet is matched with the entry of the flow table, may be 5. The 5 fields may be an IP address, a destination IP address, a source port, a destination port and a protocol respectively. For example, the fields used for judging whether the packet is matched with the entry of the flow table may be fields in a Data Link layer of an OSI model, and may also be fields in an IP layer of the OSI model.

The packet forwarding refers to that the forwarding plane device forwards a packet according to a packet forwarding table. The number of field in an entry of the packet forwarding table, which is used for judging whether the packet is matched with the entry of the packet forwarding table, is 1. For example, the fields in an entry of the packet forwarding table, which is used for judging whether the packet is matched with the entry of the packet forwarding table, may be the destination IP address, and may also be a destination MAC protocol address. Persons skilled in the art may understand that, the packet forwarding table may be an MAC table, and may also be a route table.

Persons skilled in the art can understand that the forwarding plane device may be a switch or a router.

If the forwarding plane device is a switch, the forwarding plane device may be an OPENFLOW switch. For the OPENFLOW switch, reference may be made to OPENFLOW SWITCH SPECIFICATION version 1.0 issued by SSO ONF.

Step 202: Forwarding, by the forwarding plane device, the first packet to a network device, where the first packet is used to enable the network device to determine an identity of a service according to a corresponding relationship between the identity of the user and the identity of the service as well as the identity of the user in the first packet, and manage the service according to the identity of the service.

The service refers to processing a received packet according to fields in the received packet. The fields in the packet may be information from a second layer to a seventh layer as defined by the OSI model.

For example, the service may be an NAT service, a CGN service, an IPSEC service, a video service, a firewall service, a URL filtering service, a P2P traffic virtualization service.

The video service may be a frame relay, resolution enhancement technology, a multiple document interface or a content delivery network.

For example, the service may be a forwarding service or a CAR service. If the service is a forwarding service, the forwarding service may be a layer 2 forwarding service, a layer 3 forwarding service, an MPLS forwarding service or a VPN forwarding service.

For example, the corresponding relationship may be saved in an AAA server. The network device may acquire the corresponding relationship from the AAA server. For example, the network device may acquire the corresponding relationship from the AAA server via a Radius protocol.

The identity of the service is used to identify the service.

The network device may be a control plane device corresponding to the forwarding plane device. The network device may also be a device for forwarding traffic. For example, the network device may be a router. The network device may also be a service server which can process the service.

It can be seen from the technical solutions described above that the forwarding plane device forwards the first packet received to the network device such that the network device can determine the identity of the service according to the identity of the user in the first packet, and manage the service according to the identity of the service. The technical solutions above solve the technical problem that management of services is not flexible enough in the other approaches.

Alternatively, in the method as shown in FIG. 2, managing the service according to the identity of the service may include performing, by the network device, an operation corresponding to the service to the first packet according to the identity of the service, where the network device is a first server capable of performing the service.

For example, if the service is an NAT service, the first server may be a CGN device.

For example, if the service is a CAR service, the first server may be a router capable of performing an operation corresponding to the CAR service.

For example, if the service is a video enhancement service, the first server may be a switch capable of performing an operation corresponding to the video enhancement service.

Alternatively, in the method as shown in FIG. 2, the managing the service according to the identity of the service may include generating, by the network device, a second packet by encapsulating the first packet with the identity of the service, forwarding, by the network device, the second packet to a second server, where the second server is capable of performing the service.

For example, if the service is an NAT service, the second server may be a CGN device.

For example, if the service is a CAR service, the second server may be a router capable of performing an operation corresponding to the CAR service.

For example, if the service is a video enhancement service, the second server may be a switch capable of performing an operation corresponding to the video enhancement service.

Alternatively, in the method as shown in FIG. 2, managing the service according to the identity of the service may include generating, by the network device, a forwarding table entry according to the identity of the service, and transmitting the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

The network device may be a control plane device. During a specific implementation, the network device may be an OPENFLOW controller. For the OPENFLOW controller, reference may be made to OPENFLOW SWITCH SPECIFICATION version 1.0 issued by the ONF.

The forwarding plane device may communicate with the network device via a control channel. The control channel may be a secure channel in which interactions are performed between the OPENFLOW switch and the OPENFLOW controller. For the secure channel, reference may be made to OPENFLOW SWITCH SPECIFICATION version 1.0 issued by the ONF.

Alternatively, in the method as shown in FIG. 2, after the forwarding plane device receives the first packet transmitted by the user, the method may further include performing, by the forwarding plane device, a user management operation to the user according to the identity of the user in the first packet.

The user management may be management which is performed to an on-line process of the user. For example, the user management may be assigning an IP address for the user, authenticating the user, or an authorizing the user.

In the technical solutions above, the forwarding plane device performs a user management operation to the user, and the forwarding plane device does not perform a service management operation to the user. Thus, the technical solutions above realize a separation between the user management and the service management.

FIG. 3 is a flow chart of a packet processing method according to an embodiment of the present disclosure. With reference to FIG. 3, the method includes the following steps.

Step 301: Receiving, by a network device, a second packet transmitted by a forwarding plane device, where the second packet is obtained from receiving, by the forwarding plane device, a first packet transmitted by a user, where an identity of the user is included in the first packet, and a forwarding table is included in the forwarding plane device, determining, by the forwarding plane device, an identity of a service according to a corresponding relationship between the identity of the user and the identity of the service as well as the identity of the user in the first packet, generating, by the forwarding plane device, the second packet by encapsulating the first packet with the identity of the service, transmitting, by the forwarding plane device, the second packet to the network device.

The forwarding plane device is a device for forwarding traffic. For example, the forwarding plane device may be a BRAS.

The user may be a device located in a local area network. For example, the user may be a personal computer located in a home network. The personal computer may access to Internet via a PPPoE.

The first packet may be an IP packet. For example, the IP may be IPv4, and may also be IPv6.

The identity of the user is used to identify the user. For example, the identity of the user may be an MAC protocol address of the user, and may also be an IP address of the user.

The identity of the user may also be a combination of the MAC protocol address of the user and a VLAN identity of the user.

For example, the forwarding table may be a flow table, and may also be a packet forwarding table.

The forwarding plane device may have two forwarding modes, of which one is a flow forwarding mode, the other is a packet forwarding mode.

The flow forwarding refers to that the forwarding plane device forwards a packet according to a flow table. The number of fields in an entry of the flow table, which are used for judging whether the packet is matched with the entry of the flow table, is two or more than two. For example, the number of fields in an entry of the flow table, which are used for judging whether the packet is matched with the entry of the flow table, may be 5. The 5 fields may be an IP address, a destination IP address, a source port, a destination port and a protocol respectively. For example, the fields used for judging whether the packet is matched with the entry of the flow table may be fields in a data link layer of an OSI model, and may also be fields in an IP layer of the OSI model.

The packet forwarding refers to that the forwarding plane device forwards a packet according to a packet forwarding table. The number of field in an entry of the packet forwarding table, which is used for judging whether the packet is matched with the entry of the packet forwarding table, is 1. For example, the field in an entry of the packet forwarding table, which is used for judging whether the packet is matched with the entry of the packet forwarding table, may be the destination IP address, and may also be a destination MAC protocol address. Persons skilled in the art can understand that, the packet forwarding table may be an MAC table, and may also be a route table.

Persons skilled in the art can understand that the forwarding plane device may be a switch or a router.

If the forwarding plane device is a switch, the forwarding plane device may be an OPENFLOW switch. For the OPENFLOW switch, reference may be made to OPENFLOW SWITCH SPECIFICATION version 1.0 issued by SSO ONF.

The service refers to processing a received packet according to fields in the received packet. The fields in the packet may be information from a second layer to a seventh layer as defined by the OSI model.

For example, the service may be an NAT service, a CGN service, an IPSEC service, a video service, a firewall service, a URL filtering service, a P2P traffic virtualization service. The video service may be a frame relay, resolution enhancement technology, a multiple document interface or a content delivery network.

For example, the service may be a forwarding service or a CAR service. If the service is a forwarding service, the forwarding service may be a layer 2 forwarding service, a layer 3 forwarding service, an MPLS forwarding service or a VPN forwarding service.

For example, the corresponding relationship may be saved in an AAA server. The forwarding plane device may acquire the corresponding relationship from the AAA server. For example, the forwarding plane device may acquire the corresponding relationship from the AAA server via a Radius protocol.

The identity of the service is used to identify the service.

The second packet includes the identity of the service. The identity of the service may be carried in payload of the second packet, and may also be carried in a packet header of the second packet.

Step 302: Managing, by the network device, the service according to the identity of the service in the second packet.

The network device may be a control plane device corresponding to the forwarding plane device. The network device may also be a device for forwarding traffic. For example, the network device may be a router. The network device may also be a service server which can process the service.

It can be seen from the technical solutions described above that the forwarding plane device generates the second packet by encapsulating the first packet. The identity of the service is included in the second packet. The forwarding plane device forwards the second packet to the network device such that the network device is capable of managing the service according to the identity of the service in the second packet. The technical solutions above can be used to improve the flexibility of management of the service.

Alternatively, in the method as shown in FIG. 3, the managing the service by the network device according to the identity of the service in the second packet includes performing, by the network device, an operation corresponding to the service to the second packet according to the identity of the service in the second packet, where the network device is a first server capable of performing the service.

For example, if the service is an NAT service, the first server may be a CGN device.

For example, if the service is a CAR service, the first server may be a router capable of performing an operation corresponding to the CAR service.

For example, if the service is a video enhancement service, the first server may be a switch capable of performing an operation corresponding to the video enhancement service.

Alternatively, in the method as shown in FIG. 1, managing the service by the network device according to the identity of the service in the second packet includes forwarding, by the network device, the second packet to a second server capable of performing the service according to the identity of the service in the second packet.

The network device is a device capable of forwarding traffic. For example, the network device may be a router. The network device may also be a neighboring forwarding plane device of the forwarding plane device. The network device may be a control plane device, or a control plane neighboring device of the control plane device.

Alternatively, in the method as shown in FIG. 3, managing the service by the network device according to the identity of the service in the second packet includes generating, by the network device, a forwarding table entry according to the identity of the service in the second packet, and transmitting the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

In the technical solutions above, the service may be a forwarding service.

The network device may be a control plane device. During a specific implementation, the network device may be an OPENFLOW controller. For the OPENFLOW controller, reference may be made to OPENFLOW SWITCH SPECIFICATION version 1.0 issued by the ONF.

The forwarding plane device may communicate with the network device via a control channel. The control channel may be a secure channel in which interactions are performed between the OPENFLOW switch and the OPENFLOW controller. For the secure channel, reference may be made to OPENFLOW SWITCH SPECIFICATION version 1.0 issued by the ONF.

FIG. 4 is a flow chart of a packet processing method according to an embodiment of the present disclosure. With reference to FIG. 4, the method includes the following steps.

Step 401: Receiving, by a network device, a first packet forwarded by a forwarding plane device, where the first packet is obtained from receiving, by the forwarding plane device, the first packet transmitted by a user, where an identity of the user is included in the first packet, and a forwarding table is included in the forwarding plane device, forwarding, by the forwarding plane device, the first packet to a control plane device.

The forwarding plane device is a device for forwarding traffic. For example, the forwarding plane device may be a BRAS.

The user may be a device located in a local area network. For example, the user may be a personal computer located in a home network. The personal computer may access to Internet via a PPPoE.

The first packet may be an IP packet. For example, the IP may be IPv4, and may also be IPv6.

The identity of the user is used to identify the user. For example, the identity of the user may be an MAC protocol address of the user, and may also be an IP address of the user. The identity of the user may also be a combination of the MAC protocol address of the user and a VLAN identity of the user.

For example, the forwarding table may be a flow table, and may also be a packet forwarding table.

The forwarding plane device may have two forwarding modes, of which one is a flow forwarding mode, the other is a packet forwarding mode.

The flow forwarding refers to that the forwarding plane device forwards a packet according to a flow table. The number of fields in an entry of the flow table, which are used for judging whether the packet is matched with the entry of the flow table, is two or more than two. For example, the number of fields in an entry of the flow table, which are used for judging whether the packet is matched with the entry of the flow table, may be 5. The 5 fields may be an IP address, a destination IP address, a source port, a destination port and a protocol respectively. For example, the fields used for judging whether the packet is matched with the entry of the flow table may be fields in a data link layer of an OSI model, and may also be fields in an IP layer of the OSI model.

The packet forwarding refers to that the forwarding plane device forwards a packet according to a packet forwarding table. The number of fields in an entry of the packet forwarding table, which is used for judging whether the packet is matched with the entry of the packet forwarding table, is 1. For example, the fields in an entry of the packet forwarding table, which is used for judging whether the packet is matched with the entry of the packet forwarding table, may be the destination IP address, and may also be a destination MAC protocol address. Persons skilled in the art can understand that, the packet forwarding table may be an MAC table, and may also be a route table.

Persons skilled in the art may understand that the forwarding plane device may be a switch or a router.

If the forwarding plane device is a switch, the forwarding plane device may be an OPENFLOW switch. For the OPENFLOW switch, reference may be made to OPENFLOW SWITCH SPECIFICATION version 1.0 issued by SSO ONF.

Step 402: Determining, by the network device, an identity of a service according to a corresponding relationship between the identity of the user and the identity of the service as well as the identity of the user in the first packet.

Step 403: Managing, by the network device, the service according to the identity of the service.

The service refers to processing a received packet according to fields in the received packet. The fields in the packet may be information from a second layer to a seventh layer as defined by the OSI model.

For example, the service may be an NAT service, a CGN service, an IPSEC service, a video service, a firewall service, a URL filtering service, a P2P traffic virtualization service. The video service may be a frame relay, resolution enhancement technology, a multiple document interface or a content delivery network.

For example, the service may be a forwarding service or a CAR service. If the service is a forwarding service, the forwarding service may be a layer 2 forwarding service, a layer 3 forwarding service, an MPLS forwarding service or a VPN forwarding service.

For example, the corresponding relationship may be saved in an AAA server. The network device may acquire the corresponding relationship from the AAA server. For example, the network device may acquire the corresponding relationship from the AAA server via a Radius protocol.

The identity of the service is used to identify the service.

The network device may be a control plane device corresponding to the forwarding plane device. The network device may also be a device for forwarding traffic. For example, the network device may be a router. The network device may also be a service server which is able to process the service.

It can be seen from the technical solutions described above that the forwarding plane device forwards the first packet received to the network device such that the network device can determine the identity of the service according to the identity of the user in the first packet, and manage the service according to the identity of the service. The technical solutions above solve the technical problem that management of services is not flexible enough in the other approaches.

Alternatively, in the method as shown in FIG. 4, managing the service by the network device according to the identity of the service includes performing, by the network device, an operation corresponding to the service to the first packet according to the identity of the service, where the network device is a first server capable of performing the service.

For example, if the service is an NAT service, the first server may be a CGN device.

For example, if the service is a CAR service, the first server may be a router capable of performing an operation corresponding to the CAR service.

For example, if the service is a video enhancement service, the first server may be a switch capable of performing an operation corresponding to the video enhancement service.

Alternatively, in the method as shown in FIG. 4, managing the service by the network device according to the identity of the service includes generating, by the network device, a second packet by encapsulating the first packet with the identity of the service, forwarding, by the network device, the second packet to a second server, where the second server is capable of performing the service.

For example, if the service is an NAT service, the second server may be a CGN device.

For example, if the service is a CAR service, the second server may be a router capable of performing an operation corresponding to the CAR service.

For example, if the service is a video enhancement service, the second server may be a switch capable of performing an operation corresponding to the video enhancement service.

Alternatively, in the method as shown in FIG. 4, managing the service by the network device according to the identity of the service includes generating, by the network device, a forwarding table entry according to the identity of the service, and transmitting the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

The network device may be a control plane device. During a specific implementation, the network device may be an OPENFLOW controller. For the OPENFLOW controller, reference may be made to OPENFLOW SWITCH SPECIFICATION version 1.0 issued by the ONF.

The forwarding plane device may communicate with the network device via a control channel. The control channel may be a secure channel in which interactions are performed between the OPENFLOW switch and the OPENFLOW controller. For the secure channel, reference may be made to OPENFLOW SWITCH SPECIFICATION version 1.0 issued by the ONF.

FIG. 5 is a forwarding plane device according to an embodiment of the present disclosure. The forwarding plane device may implement the method as shown in FIG. 1. With reference to FIG. 5, the device includes a receiving unit 51, a determining unit 52, a generating unit 53 and a transmitting unit 54.

The receiving unit 51 is configured to receive a first packet transmitted by a user, where an identity of the user is included in the first packet, and a forwarding table is included in the forwarding plane device.

For example, the receiving unit 51 may be a receiver.

The determining unit 52 is configured to determine an identity of a service according to a corresponding relationship between the identity of the user and the identity of the service as well as the identity of the user in the first packet received by the receiving unit 51.

For example, the determining 52 may be a network processor (NP).

The generating unit 53 is configured to generate a second packet by encapsulating the first packet with the identity of the service determined by the determining unit 52.

For example, the generating unit 53 may be the NP.

The transmitting unit 54 is configured to transmit the second packet generated by the generating unit 53 to a network device, where the second packet is used to enable the network device to manage the service according to the identity of the service in the second packet.

For example, the transmitting unit 54 may be a transmitter.

Figure 6:
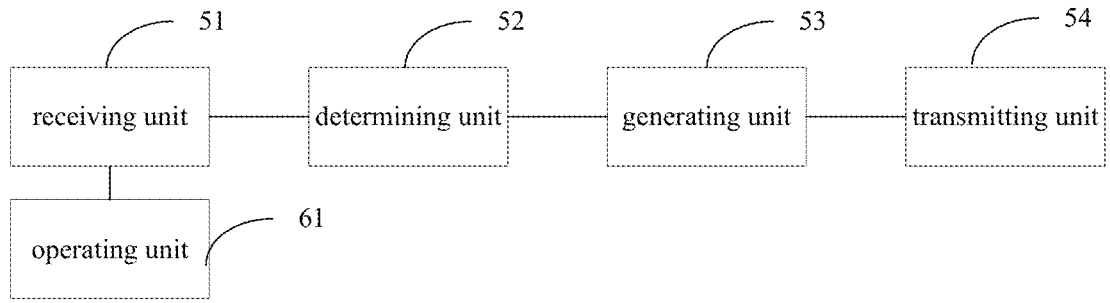
FIG. 6 is a schematic structural diagram of a forwarding plane device according to an embodiment of the present disclosure.

Alternatively, the device as shown in FIG. 5 may also include an operating unit 61 configured to perform a user management operation to the user according to the identity of the user in the first packet received by the receiving unit 51. For the operating unit 61, reference may be made to FIG. 6. FIG. 6 is a schematic structural diagram of a forwarding plane device according to an embodiment of the present disclosure.

Figure 7:
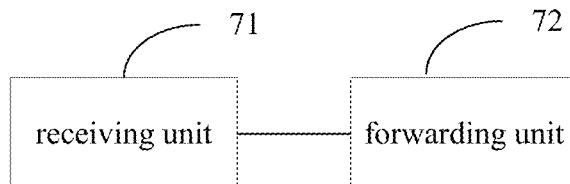
FIG. 7 is a schematic structural diagram of a network device according to an embodiment of the present disclosure.

FIG. 7 is a schematic structural diagram of a forwarding plane device according to an embodiment of the present disclosure. The forwarding plane device may implement the method as shown in FIG. 2. The forwarding plane device includes a receiving unit 71 and a forwarding unit 72.

The receiving unit 71 is configured to receive a packet transmitted by a user, where an identity of the user is included in the packet, and a forwarding table is included in the forwarding plane device.

For example, the receiving unit 71 may be a receiver.

The forwarding unit 72 is configured to forward the packet received by the receiving unit 71 to a network device, where the packet is used to enable the network device to determine an identity of a service according to a corresponding relationship between the identity of the user and the identity of the service as well as the identity of the user in the packet, and manage the service according to the identity of the service.

For example, the forwarding unit 72 may be a forwarder.

Figure 8:
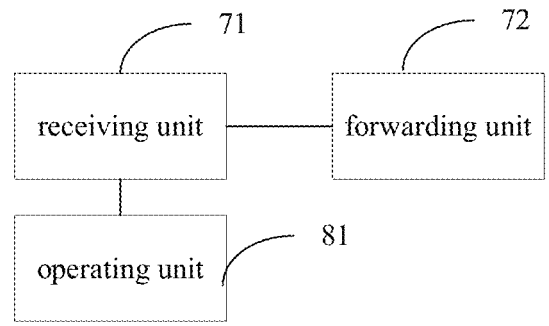
FIG. 8 is a schematic structural diagram of a network device according to an embodiment of the present disclosure.

Alternatively, in the device as shown in FIG. 7, an operating unit 81 may also be included, which is configured to perform a user management operation to the user according to the identity of the user in the packet received by the receiving unit 71. For the operating unit 81, reference may be made to FIG. 8. FIG. 8 is a schematic structural diagram of a forwarding plane device according to an embodiment of the present disclosure.

Figure 9:
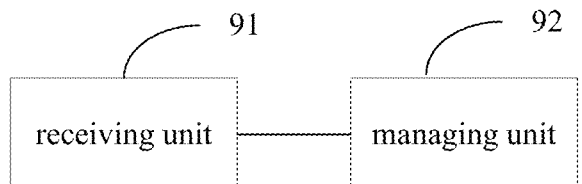
FIG. 9 is a schematic structural diagram of a network device according to an embodiment of the present disclosure.

FIG. 9 is a schematic structural diagram of a network device according to an embodiment of the present disclosure. The network device may implement the method as shown in FIG. 3. With reference to FIG. 9, the network device includes a receiving unit 91 and a managing unit 92.

The receiving unit 91 is configured to receive a second packet transmitted by a forwarding plane device, where the second packet is obtained from receiving, by the forwarding plane device, a first packet transmitted by a user, where an identity of the user is included in the first packet, and a forwarding table is included in the forwarding plane device, determining, by the forwarding plane device, an identity of a service according to a corresponding relationship between the identity of the user and the identity of the service as well as the identity of the user in the first packet, generating the second packet by encapsulating the first packet with the identity of the service, transmitting, by the forwarding plane device, the second packet to the network device.

For example, the receiving unit 91 may be a receiver.

The managing unit 92 is configured to manage the service according to the identity of the service in the second packet received by the receiving unit 91.

For example, the managing unit 92 may be an NP.

Alternatively, in the network device as shown in FIG. 9, the managing unit 92 may be configured to perform an operation corresponding to the service to the second packet according to the identity of the service in the second packet, and the network device is a first server capable of performing the service.

Alternatively, in the network device as shown in FIG. 9, the managing unit 92 may be configured to forward the second packet to a second server capable of performing the service according to the identity of the service in the second packet.

Alternatively, in the network device as shown in FIG. 9, the managing unit 92 may be configured to generate a forwarding table entry according to the identity of the service in the second packet, and transmit the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

Figure 10:
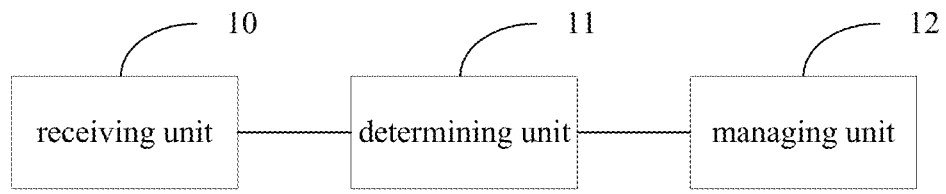
FIG. 10 is a schematic structural diagram of a network device according to an embodiment of the present disclosure.

FIG. 10 is a schematic structural diagram of a network device according to an embodiment of the present disclosure. The network device may implement the method as shown in FIG. 4. With reference to FIG. 10, the network device includes a receiving unit 10, a determining unit 11 and a managing unit 12.

The receiving unit 10 is configured to receive a first packet forwarded by a forwarding plane device, where the first packet is obtained from a following pathway receiving, by the forwarding plane device, the first packet transmitted by a user, where an identity of the user is included in the first packet, and a forwarding table is included in the forwarding plane device, forwarding, by the forwarding plane device, the first packet to the network device.

The determining unit 11 is configured to determine an identity of a service according to a corresponding relationship between the identity of the user and the identity of the service as well as the identity of the user in the first packet.

The managing unit 12 is configured to manage the service according to the identity of the service determined by the determining unit 11.

Alternatively, in the network device as shown in FIG. 10, the managing unit 12 is further configured to perform an operation corresponding to the service to the packet according to the identity of the service, and the network device is a first server capable of performing the service.

Alternatively, in the network device as shown in FIG. 10, the managing unit 12 is further configured to generate a second packet by encapsulating the first packet with the identity of the service.

Alternatively, in the network device as shown in FIG. 10, the managing unit 12 is further configured to generate a forwarding table entry according to the identity of the service, and transmit the forwarding table entry to the forwarding plane device, where a matching domain in the forwarding table entry includes the identity of the user, the forwarding table entry is used to enable the forwarding plane device to update the forwarding table in the forwarding plane device according to the forwarding table entry to generate an updated forwarding table, the forwarding plane device is capable of performing an operation corresponding to the service to a packet including the identity of the user according to the updated forwarding table, and the network device is a control plane device corresponding to the forwarding plane device.

Figure 11:
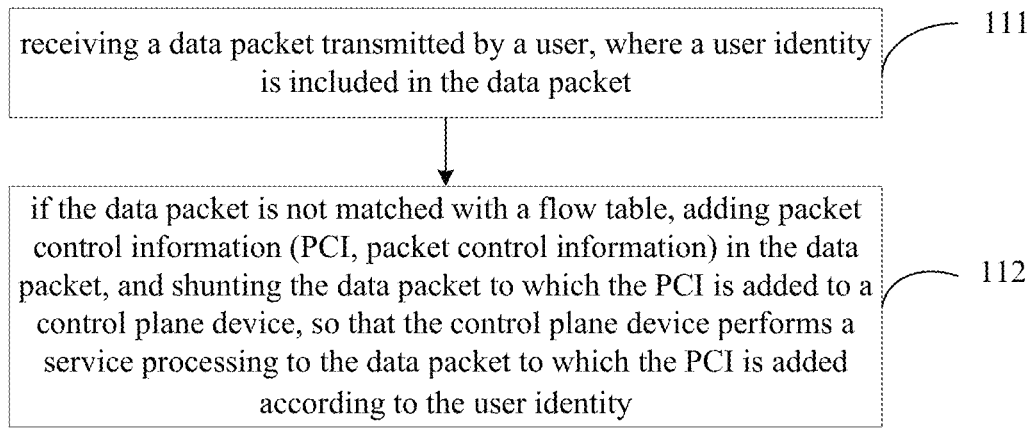
FIG. 11 is a flow chart of a packet processing method according to an embodiment of the present disclosure.

FIG. 11 is a flow chart of a packet processing method according to an embodiment of the present disclosure. A user registers a service in an AAA server successfully in advance. The network device is a control plane device. With reference to FIG. 11, the method includes the following steps.

Step 111: Receiving a data packet transmitted by a user, where a user identity is included in the data packet.

In this embodiment, a forwarding plane device may receive the data packet transmitted by the user, and may also receive the data packet transmitted by the user via a convergence layer network, generally, the user identity is included in the data packet, certainly, other parameters may also be included, such as a service identity.

The forwarding plane device may be a BRAS, but management for the user by the BRAS is separated from service management, certainly, the forwarding plane device may also be a router, and may also be other devices with forwarding functions, this embodiment will not make a limitation.

Step 112: If the data packet is not matched with a flow table, adding packet control information (PCI) in the data packet, and shunting the data packet to which the PCI is added to a control plane device such that the control plane device performs a service processing to the data packet to which the PCI is added according to the user identity.

Protocol control information belongs to a part of a protocol data unit, including address, control, symbol and other optional information, which is a service provided by a peer layer service provider.

In this embodiment, after receiving a data packet, the forwarding plane device judges whether the data packet is matched with a flow table according to five-tuple elements of the packet firstly, where, the flow table is transmitted by a control plane device to the forwarding plane device in advance, if the data packet is not matched with the flow table, adds PCI in the data packet, and shunts the data packet to which the PCI is added to the control plane device such that the control plane device performs a service processing to the data packet according to the user identity, that is to say, perform a corresponding processing to the data packet according to a service registered by a corresponding user. Certainly, if the data packet is matched with the flow table, then forward the data packet according to an address of the flow table.

The user identity may include an IP address of the user, a MAC address, and/or the MAC address+a VLAN, but is not limited thereto.

In embodiments of the present disclosure, a data packet which is not matched with a flow table is shunted to a control plane device, and is processed by the control plane device such that user management and service control are shunted to different devices to be processed, thus the traffic pressure of an access network is reduced, and the management is simplified.

Figure 12:
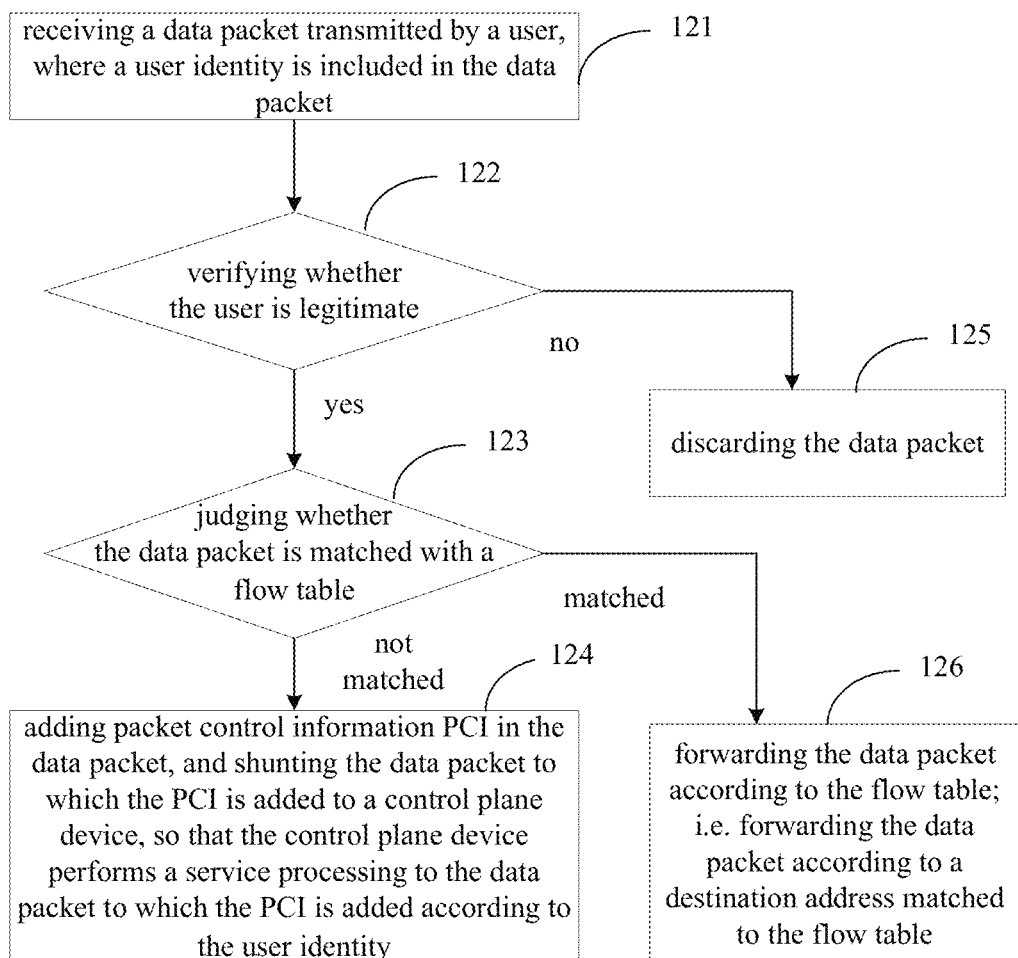
FIG. 12 is a flow chart of a packet processing method according to an embodiment of the present disclosure.

Reference may also be made to FIG. 12. FIG. 12 is a fourth flow chart of a packet processing method according to an embodiment of the present disclosure, on the basis of FIG. 11, the method may also include verifying whether the user is legitimate when receiving a data packet transmitted by a user, and the method may further include the following steps.

Step 121: Receiving a data packet transmitted by a user, where a user identity is included in the data packet.

Step 122: Verifying whether the user is legitimate, if legitimate, perform step 123, otherwise, perform step 125.

Since the relationship between a user and a service registered by the user is saved in an AAA server, the forwarding plane device, when receiving a data packet transmitted by the user, or after receiving a data packet transmitted by the user, authenticates whether the user is legitimate via the AAA server firstly, if pass the authentication, then it indicates that the user is a legitimate user, and a user which has been registered successfully, and then perform step 123, if not pass the authentication, then it indicates that the user is an illegitimate user, then discard the data packet transmitted by the user.

In this embodiment, the AAA server may be deployed independently, and may also be integrated in the forwarding plane device. This embodiment will not make a limitation.

Step 123: Judging whether the data packet is matched with a flow table, if not matched, perform step 124, if matched, perform step 126.

Judging whether the data packet is matched to a corresponding entry in the flow table, the judging may be performed according to five-tuple elements of the packet. As for persons skilled in the art, a specific matching process is a known technology, and will not be repeated herein.

Step 124: Adding PCI in the data packet, and shunting the data packet to which the PCI is added to a control plane device such that the control plane device performs a service processing to the data packet to which the PCI is added according to the user identity.

The user identity includes an IP address of the user, a MAC address, or the MAC address+a VLAN.

Step 125: Discarding the data packet.

Step 126: Forwarding the data packet according to the flow table, i.e. forwarding the data packet according to a destination address matched to the flow table.

In embodiments of the present disclosure, after receiving a data packet transmitted by a user, the forwarding plane device verifies the legitimacy of the user firstly, if the user is legitimate, then judges whether the data packet is matched to an entry in a flow table, then, shunts a data packet which is not matched to an entry to a control plane, and a corresponding service processing is performed to the data packet by the control plane device according to a user identity. Meanwhile, since user management is separated from service processing, the data packet may carry the user identity or a service identity. In this case, the forwarding plane device (such as a BRAS device) can focus on the user management, and the service processing can be operated in the control plane device (such as a service server). That is to say, all types of services, which are operated in a plurality of forwarding plane devices (such as the BRAS) before, may now concentrate on a control plane device (such as a service server cluster or a data center) to be operated, thereby reducing the traffic pressure of an access convergence network. Furthermore, since a user management device is deployed in a convergence layer, the position of the user management is reduced, and a demand of rapid-growth bandwidth is satisfied.

Alternatively, in the embodiments described above, before shunting the data packet to which the PCI is added to the control plane device, the method may also include acquiring an association among the user, a service identity and the service, adding the service identity in the PCI of the data packet, where, a process for the acquiring may be acquired from the AAA server, and may also be acquired from the forwarding plane device, this embodiment will not make a limitation.

The shunting the data packet to which the PCI is added to the control plane device includes shunting the data packet to which a service identity is added to the control plane device. The service identity includes one-layer VLAN identity (also referred as ID), multilayer VLAN ID (such as QinQ) or a service profile ID, or the service identity represents a service (such as an internet service, a voice service), or each bit represents a service.

Alternatively, when the service identity is the service profile ID, before adding the service identity in the PCI of the data packet, the method may also include acquiring a service profile ID subscribed by a user, recording the service profile ID in a service profile field of a user table.

Two cases are taken as an example of adding the service identity in the PCI of the data packet, but is not limited thereto:

One case is that the forwarding plane device performs a multiprotocol label switching MPLS encapsulation to the data packet, and judges whether an MPLS label value in the encapsulated data packet is identical to one of prestored MPLS labels, if yes, performs a matching operation for the user table, if a user table entry in the user table is matched successfully, extract a service profile field value in the user table entry, add the service profile field value in the PCI of the data packet, where, the service profile field value is a service profile ID, The other case is that the forwarding plane device performs an IP encapsulation to the data packet, and judges whether an IP value in the encapsulated data packet is identical to one of prestored IP values, if yes, perform a matching operation for the user table, if a user table entry in the user table is matched successfully, extract a service profile field value in the user table entry, add the service profile field value in the PCI of the data packet, where, the service profile field value is a service profile ID.

Alternatively, in the embodiments described above, before receiving the data packet transmitted by the user, the method may also include, after detecting that the user is on line, transmitting a request for applying for an IP address for the user to a control plane device by the forwarding plane device, and after receiving a response including an IP address transmitted by the control plane device, transmitting the IP address to the user such that the user subsequently initiates the data packet, that is to say, the IP address is included in the data packet transmitted by the user subsequently.

In embodiments of the present disclosure, a data packet which is not matched to an entry is shunted to a control plane device, and is processed by the control plane device, thus the traffic pressure of a user access side network (such as a convergence network) is reduced. Meanwhile, since user management is separated from service processing, and the data packet may carry the user identity or a service identity, in this case, the forwarding plane device (such as a BRAS device) may focus on the user management, and the service processing may be operated in the control plane device (such as a service server). That is to say, all types of services, which are operated in a plurality of forwarding plane devices (such as the BRAS) before, may now concentrate on one control plane device (such as a service server cluster or a data center) to be operated, thereby reducing the traffic pressure of an access convergence network.

Figure 13:
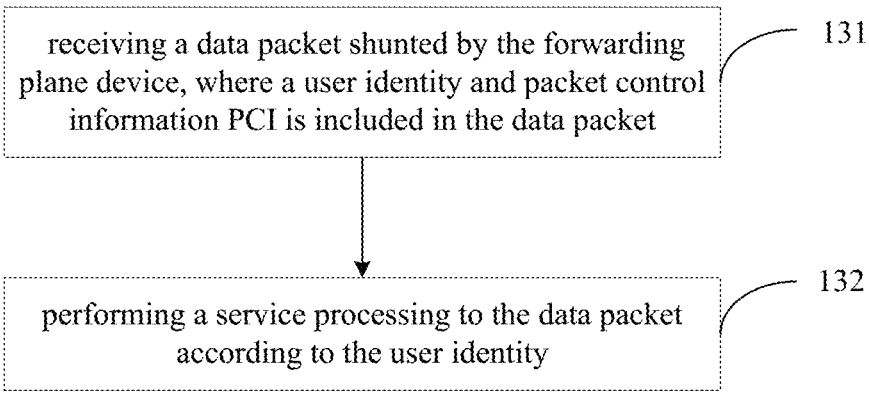
FIG. 13 is a flow chart of a packet processing method according to an embodiment of the present disclosure.

Reference may also be made to FIG. 13 which is a fifth flow chart of a packet processing method according to an embodiment of the present disclosure, here, a control plane device is still taken as an example of the network device, the method includes the following steps.

Step 131: Receiving a data packet shunted by the forwarding plane device, where a user identity and PCI is included in the data packet.

In this embodiment, a control plane device (such as a value-added server) receives a data packet shunted by the forwarding plane device, parses the data packet, and obtains a user identity included in the data packet. When the forwarding plane device shunts a data packet, the forwarding plane device adds PCI in the data packet.

Step 132: Performing a service processing to the data packet according to the user identity.

In this step, the control plane device judges to which user the data packet belongs through the user identity, obtains a service registered by the user, and performs a corresponding service processing to the data packet.

In embodiments of the present disclosure, after receiving a data packet, a control plane device obtains a service registered by a user through a user identity, and invokes the service to process the data packet.

Alternatively, in the embodiments described above, after receiving the data packet shunted by the forwarding plane device, the method may also include acquiring a user corresponding to the user identity, and the relationship between the user and a registered service, the relationship between the user and the registered service may be acquired via a change of authorization (COA) message, but is not limited thereto.

The performing the service processing to the data packet according to the user identity further includes invoking a service registered by the user to perform the service processing to the data packet. The user identity may include an IP address of the user, a MAC address, and/or the MAC address+a VLAN, but is not limited thereto.

That is to say, the control plane device judges to which user the data packet belongs via a user identity firstly, then, may obtain a service registered by the user from an AAA server via the COA message, and invoke the service to perform a service processing to the data packet. Certainly, the AAA server may also transmit the user and the registered service to the control plane device via the COA message actively. For example, when a user's online, offline, or subscribed services changes, the AAA server may notice the control plane device (such as a value-added service (VAS) server) via the COA message, and the control plane device (such as a VAS server) updates the relationship between a service and a user.

Alternatively, in the embodiments described above, the method may also include acquiring, by the control plane device actively or passively, a changed relationship between a user and a registered service from the AAA server, and updating the stored relationship between the user and the registered service.

Alternatively, if a service identity is included in the PCI of the data packet, priority of the service identity is higher than that of the user identity. Performing the service processing to the data packet according to the registered service of the user corresponding to the user identity includes invoking a service corresponding to the service identity to perform the service processing to the data packet. The service identity may include one-layer VLAN ID, multilayer VLAN ID or a service profile ID, or the service identity represents a service, or each bit represents a service, but is not limited thereto.

Hence, as long as the service identity is included in the PCI of the data packet, the control plane device does not need to acquire a service registered by the user from the AAA server, but directly invoking a service corresponding to the service identity to process the data packet.

Invoking the service corresponding to the service identity to perform the service processing to the data packet further includes acquiring a corresponding service identity in the data packet, determining a specific service corresponding to the service identity, invoking the specific service corresponding to the service identity, and performing the service processing to the data packet.

Alternatively, in the embodiments as described above, before receiving the data packet, the method may also include receiving, by the control plane device, a request for applying for an IP address for the user which is transmitted by the forwarding plane device, and transmitting a response including the IP address to the forwarding plane device.

In order to make it convenient for those skilled in the art to understand, specific embodiments are described hereunder.

Embodiment 1

Figure 14:
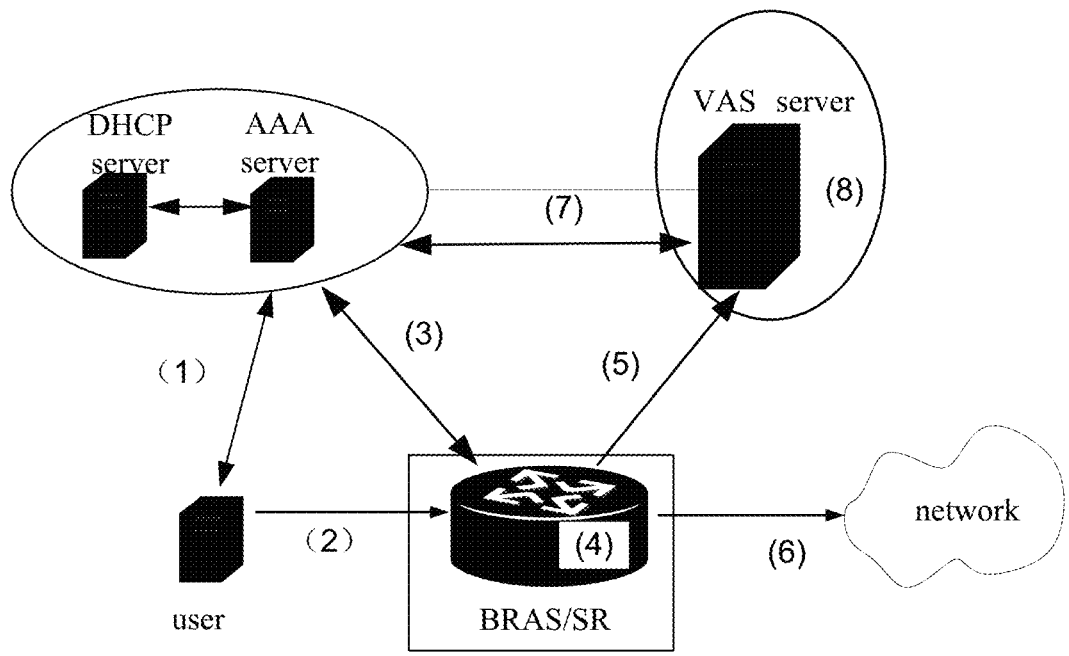
FIG. 14 is a schematic diagram of an application example of a packet processing method according to an embodiment of the present disclosure.

Reference may be made to FIG. 14 which is a schematic diagram of a first application example of a service data shunting method according to an embodiment of the present disclosure. In this embodiment, an example is taken where a user identity is included in a data packet, the forwarding plane device is a BRAS/SR, and the network device is a VAS server, but is not limited thereto. In this embodiment an example is taken where the packet is a data packet, but is not limited thereto, a specific implementation process includes the following steps.

(1) Registering, by a user, a service on the AAA server firstly, after the registration is successful, a relationship between the user and its registered service being stored in the AAA server.

(2) Initiating, by one or more users (this embodiment takes one user as an example), a data packet to the BRAS/SR, a user identity is included in the data packet, where, the user identity generally uses a user IP address, certainly, an MAC address or MAC+VLAN may also be taken as the user identity, all these identities are constituent parts of a header, thus the shunted data packet generally includes these information.

(3) After receiving the data packet, verifying, by the BRAS/SR, whether the user is legitimate through the AAA server, its verifying methods are known technologies for persons skilled in the art, and will not be repeated herein, performing step (4) directly for a data packet transmitted by a legitimate user.

(4) Judging, by the BRAS/SR, whether the data packet is matched with a received flow table transmitted by an upper layer device (such as a VAS server) firstly, if not matched, then adding PCI in the data packet, and shunting the data packet to which the PCI is added to the VAS server, i.e. reference sign (5), if matched, forwarding the data packet according to the flow table, i.e. reference sign (6). For a specific procedure of processing the data packet by the BRAS/SR, reference may be made to the descriptions above, and will not be repeated herein.

(5) After receiving the data packet shunted by the BRAS/SR, performing, by the VAS server, a service processing to the data packet according to the user identity.

(7) After receiving the data packet, acquiring, by the VAS server, the relationship between the user and the service through the AAA server firstly, thereby acquiring service processes by which the data packet of the user needs to be processed.

(8) Invoking, by the VAS server, the service registered by the user to perform the service processing to the data packet.

For example, if services registered by user 1 include service 1, service 2, service 3 and the like, services registered by user 2 include service 1, service 2, service 3 and the like.

In this embodiment, during receiving the shunted data packet, the VAS server firstly acquires the relationship between the user and the service through the AAA server, thereby acquiring managed services by which the data packet of the user needs to be processed, when the BRAS/SR leads the data packet (data flow) to the VAS server, the VAS server obtains the user identity carried in the data packet by parsing, and judges to which user the data packet belongs through the user identity, thereby invoking a corresponding service to process the data packet.

In Embodiment 1 described above, when the user's online, offline or subscribed services change, the AAA server may notice the VAS server via the COA message, and the VAS server updates the relationship between the service and the user.

Embodiment 2

Figure 15:
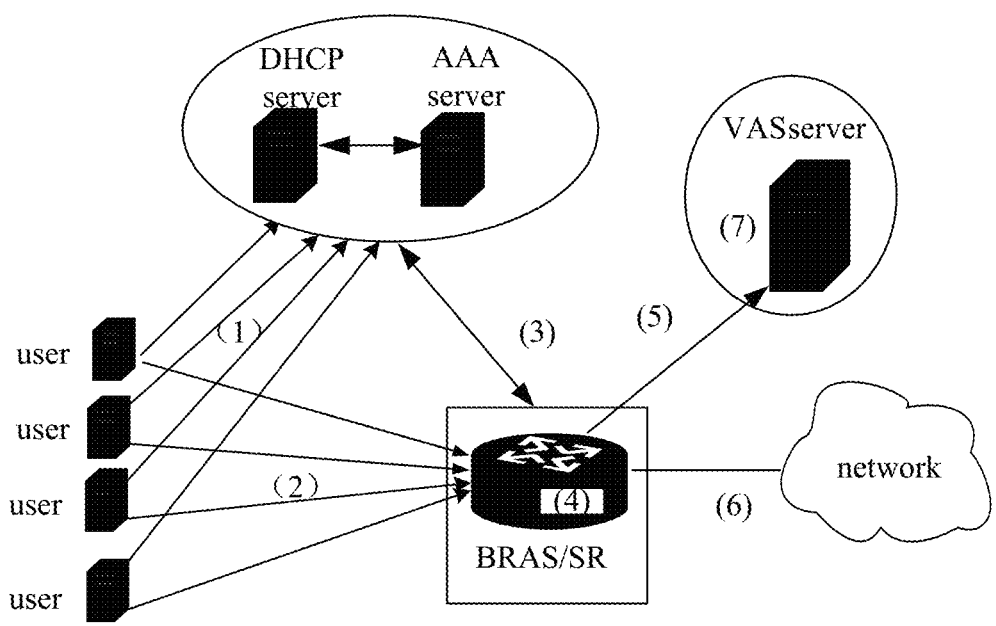
FIG. 15 is a schematic diagram of an application example of a packet processing method according to an embodiment of the present disclosure.

Reference may be made to FIG. 15 which is a schematic diagram of a second application example of a service data shunting method according to an embodiment of the present disclosure. In this embodiment, an example is taken where a service identity is included in a data packet, however, in practical use, data includes a user identity and the service identity, an example is taken where priority of the service identity is higher than the user identity, the forwarding plane device is a BRAS/SR, and the network device is a VAS server, but is not limited thereto. A specific implementation process includes the following steps.

(1) Registering, by a user, a service on the AAA server firstly, after the registration is successful, a relationship between the user and its registered service being stored in the AAA server.

(2) Initiating, by one or more users (this embodiment takes more users as an example), a data packet to the BRAS/SR, a service identity is included in the data packet, where, the service identity may be one-layer VLAN ID (also referred to as vlanid), multilayer VLAN ID (such as QinQ) or a service profile ID, or, the service identity may also be a service or a service set, or each bit of the service identity represents a service.

(3) Before receiving the data packet transmitted by the user, obtaining, by the BRAS/SR, an association among the user, the service identity and the service if detecting that the user is online, such relationship may be acquired from the AAA server, and may also be managed by the BRAS/SR itself.

(4) When receiving the data packet transmitted by the user, judging, by the BRAS/SR, whether the data packet is matched with a received flow table transmitted by an upper layer device (such as a VAS server) firstly, if not matched, then adding PCI in the data packet, adding the service identity in the PCI, and shunting the data packet to which the service identity is added to the VAS server, i.e. reference sign (5), if matched, forwarding the data packet according to the flow table, i.e. reference sign (6).

That is to say, in this process, when the data packet of a legitimate user enters into the BRAS/SR, the BRAS/SR will label the service identity to the data packet which is not matched with the flow table, and shunt the data packet to which the service identity is labeled to the VAS server to be processed.

(7) After receiving the data packet, identifying, by the VAS server, the service identity of the data packet, and distributing the data packet to all services to be processed correspondingly according to the maintained relationship between the service identity and a specific service and according to the service identity. For example, services corresponding to service identity 1 include service 1, service 2, service 3 and the like, services corresponding to service identity 2 include service 2, service 3, service 4, and the like.

A process is described hereunder where one vlanid, multiple vlanids and a service profile ID are used to represent the service identity respectively.

(1) If one vlanid is used to represent the service identity.

In this embodiment, a vlanid carried in a shunted packet may be taken as the service identity directly, this way does not need to add a field as the service identity specially, if a user needs to change a service (or a service profile), it only needs to change the vlanid only to implement it, and the operation is simple.

Additionally, in this embodiment, if a user selects a service (or a service profile) through a portal server or other management tools, the Portal server will set a vlanid for a local online device (or a software), to indicate that the user uses this vlanid to get online, and the vlanid is carried in a data packet initiated by the user subsequently.

Certainly, the BRAS/SR may also configure, under an interface, the user to get online by a user-vlan any-other way, the user gets online after an authentication and authorization are successful, and the user packet will carry the vlanid.

It should be noted, when a user changes a service (or a service profile), a client software (or a device close to the client) only needs to change the vlanid, that will be fine.

(2) If multiple vlanids (such as QinQ) are used to represent the service identity, its implementation procedure is similar to getting online using one vlanid, the difference lies in that an outer vlanid may be taken as the service identity, and an inner vlanid may also be taken as the service identity, or a combination of both is taken as the service identity.

(3) If a service profile ID is used to represent the service identity such an implementation needs to add a field for saving a service profile ID value in a header of a shunted data packet, this way needs to modify flow table logic and an NP microcode, its process includes the following.

1. Reserve a service profile ID field such as 2 bytes and 3 bytes in a PCI header of a data packet needs to be shunted.

2. Increase a shunting enable register flag in the NP microcode, increasing a service profile ID field in a user table in the NP microcode, increasing a register for storing an MPLS label value which is the same as that of flow table logic.

3. After a user selects a service (or a service profile) through a portal server or other management tools, the portal server records an association between the service profile ID and the user in the AAA server.

4. After getting online, the user goes through authentication and authorization through the AAA server firstly, then, the AAA server sends the service profile ID subscribed by the user to the BRAS/SR, the BRAS/SR records the service profile ID in the user table of the forwarding plane NP microcode.

5. The data packet enters into the flow table logic, the flow table logic looks up the flow table, and encapsulates the data packet which does not hit the flow table. That is, increasing a PCI header and an MPLS encapsulation, and transmitting the encapsulated data packet to the NP microcode, the NP microcode judges diversion enable, if an MPLS label value of the data packet is identical to one of label values in the register, then perform an NP new process, i.e. offsetting the data packet to the original packet header (that is, the packet header when entering into the flow table logic), performing a user table matching operation, if a corresponding user table entry in the user table is matched, then taking out a corresponding service profile filed value in the entry (i.e. the service profile ID value), filling in the packet field value to a packet field in the PCI header of the data packet, if an MPLS label value of the data packet is not identical to one of label values in the register, make an implementation according to an existing process of the NP microcode, the existing process of the NP microcode is a known technology for persons skilled in the art, and will not be repeated herein.

Additionally, in embodiments of the present disclosure, the encapsulating of the data packet may also use a processing flow of an IP encapsulation method, which is similar to an MPLS encapsulation method. Reference may be made to the descriptions above for details, and will not be repeated herein.

Embodiment 3

Figure 16:
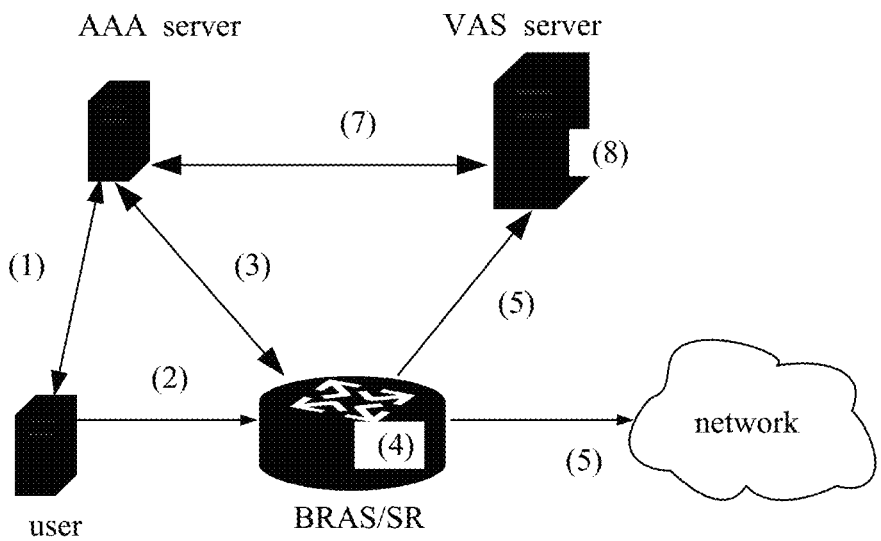
FIG. 16 is a schematic diagram of an application example of a packet processing method according to an embodiment of the present disclosure.

Reference may be made to FIG. 16 which is a schematic diagram of a third application example of a service data shunting method according to an embodiment of the present disclosure. Embodiment 3 is similar to Embodiment 1, the difference lies in that, Dynamic Host Configuration Protocol (DHCP) service function is provided by the VAS server. After a router (such as the BRAS/SR) receives a user online request, the router performs an authentication to the AAA server, if the authentication is successful, then applies for an IP address to the VAS server, after the IP address is applied successfully, the VAS server transmits a message including the IP address to the AAA server, and records a relationship between the IP address and the user in the AAA server. The VAS server also transmits the IP address to the router, the router then transmits the IP address to the user, after that, the user may transmit a data packet to the router (such as the BRAS/SR), where the data packet carries the IP address, and the processing flow performed by the router (such as the BRAS/SR) after receiving the data packet is the same as Embodiment 1. Reference may be made to Embodiment 1 for details, and will not be repeated herein.

It may be known from the embodiments described above, after user management and a service are decoupled to different devices, a user management device may be deployed in a convergence layer and close to a user, and traffic among users can be ended in the user management device, thus the traffic pressure of an access convergence network is reduced, and after the user and the service are decoupled, the user management device may be deployed in the convergence layer access side. Upper layers do not need to perceive user information, thus the workload that the service fulfillment needs to perceive the user information is reduced, and after the user is separated from the service, the service is processed by a server, which can be deployed centrally and updated independently, without affecting the user online experience.

It may be known from the embodiments described above, compared with the other approaches, embodiments of the present disclosure have the following advantages.

1. Implement a separation between service deployment and the user management, simplify the management, that is to say, the other approaches requires that the user management and the service processing be performed on a same device (such as the BRAS or the SR device). Embodiments of the present disclosure can make the user management separate from the service processing. Since a data packet may carry a user identity or/a service identity, thus the BRAS device can focus on the user management, and the service processing can be operated on a service server. Particularly, all types of services, which are operated in a plurality of BRASs originally, can now concentrate on a service server cluster or a data center to be operated 2. Enable an operator to deploy a value-added service rapidly, that is to say, since technologies of the present disclosure enable a service to be deployed independent from the user management, thus after a new value-added service is developed, completely, the user deployed part may not need to be changed, i.e. no need to update the BRAS device. What needs to do is only to change the service processing on a service server, moreover, a new service may be deployed online, without affecting the operation of old services.

3. Enable the network evolution to reduce the position of the user management and satisfy an increasing demand on bandwidth, that is to say, since the user management is separated from the service deployment, the user management can move from a current BRAS router position, i.e. the network convergence layer, down to a user access layer position. This layer is much closer to the user, and makes the management on the bandwidth of the user more flexible and efficient.

It should be noted that, in the description herein, the terms like "first" and "second" are only used to differentiate one entity or operation from another, but is not necessarily construed as any practical relationship or order between the entities or operations. Moreover, the terms "include," "comprise" and any variation thereof refer to "including but not limited to." Therefore, in the context of a process, method, object or device that includes a series of elements, the process, method, object or device not only includes such elements, but also includes other elements not specified explicitly, or may include inherent elements of the process, method, object or device. Unless otherwise specified, in the context of "include" or "comprise," the process, method, object or device that includes or comprises the specified elements may include other identical elements.

Those skilled in the art can clearly understand that units and algorithm steps in various examples described in connection with embodiments of this disclosure can be implemented by electric hardware, computer software, or a combination of thereof. Whether to implement by hardware or software depends on particular applications and design restrictions of the technical solution. Those skilled in the art may realize the described functions in different ways for each particular application, which however should not be considered as going beyond the scope of this disclosure.

It can be clearly understood by persons skilled in the art that, for the purpose of convenient and brief description, for a detailed working process of the foregoing system, device and unit, reference may be made to the corresponding process in the method embodiments, and the details will not be described herein again.

In several embodiments provided in the present application, it should be understood that the disclosed system, device, and method may be implemented in other ways. For example, the described device embodiments are merely exemplary. For example, the unit division is merely logical function division and can be other divisions in actual implementation. For example, multiple units or components can be combined or integrated into another system, or some features can be ignored or not performed. Furthermore, the shown or discussed coupling or direct coupling or communication connection may be accomplished through indirect coupling or communication connection between some interfaces, devices or units in an electrical form, a mechanical form, or in other forms.

Units described as separate components may be or may not be physically separated. Components shown as units may be or may not be physical units, that is, may be located in one place, or distributed to multiple network units. Some or all of the units may be selected to achieve the objective of the solution of the embodiment according to actual requirements.

In addition, various functional units according to each embodiment of the present disclosure may be integrated in one processing module or may exist as separate physical units, or two or more units may also be integrated in one unit.

When the above functions are implemented in the form of the software functional module and sold or used as a separate product, they may be stored in a computer readable storage medium. Therefore, the technical solution of the present disclosure or the part that makes contributions to the other approaches or a part of the technical solution can be substantially embodied in the form of a software product. The computer software product is stored in a storage medium, and contains several instructions to instruct computer equipment (such as, a personal computer, a server, or network equipment) to perform all or part of steps of the method as described in the embodiments of the present disclosure. The storage medium includes various media capable of storing program codes, such as, a flash disk, a mobile hard disk, a Read-Only Memory (ROM), a Random Access Memory (RAM), a magnetic disk or an optical disk.

The above are merely exemplary embodiments of the present disclosure, but the protection scope of the present disclosure is not limited herein. Any change or replacement that can be easily figured out by persons skilled in the art within the technical scope disclosed by the present disclosure shall be covered by the protection scope of the present disclosure. Therefore, the protection scope of the present disclosure shall be defined by the claims.

The invention claimed is:

1. A system, comprising:
 a control plane device configured to:
  receive a request for allocating a first Internet Protocol (IP) address to a first user;
  allocate, in response to receiving the request, the first IP address to the first user; and
  transmit a response including the first IP address; and
 a forwarding plane device applied to a broadband remote access server (BRAS) and communicatively coupled to and separated from the control plane device, wherein the forwarding plane device is configured to:
  transmit, to the control plane device, the request;
  receive, from the control plane device, the response; and
  transmit, to the first user, the first IP address to enable the first IP address to be included in a first data packet from the first user,
 wherein the control plane device is further configured to:
  generate a forwarding rule, wherein the forwarding rule enables the forwarding plane device to forward a second data packet from a second user; and
  send, to the forwarding plane device, the forwarding rule,
 wherein the forwarding plane device is further configured to:
  receive, from the second user, the second data packet comprising an identity of the second user; and
  transmit, the second data packet according to the identity and the forwarding rule, and
  wherein the identity comprises both a media access control (MAC) address and a virtual local area network (VLAN) identifier.

2. The system of claim 1, wherein the forwarding rule comprises a field for matching the first data packet, and wherein the field comprises a destination IP address.

3. The system of claim 1, wherein the control plane device is further configured to manage a service for a second packet from the first user, and wherein the service comprises a network address translation (NAT) service, a carrier-grade network address translation (CGN) service, an IP Security (IPSEC) service, a video service, a firewall service, a Uniform Resource Locator (URL) filtering service, or a peer-to-peer (P2P) traffic virtualization service.

4. The system of claim 3, wherein the control plane device is further configured to:
 perform an operation corresponding to the service to the second packet; or
 forward, to a server capable of performing the operation, the second packet.

5. A forwarding plane device applied to a broadband remote access server (BRAS), wherein the forwarding plane device comprises:
 a memory configured to store instructions; and
 one or more processors coupled to the memory and configured to execute the instructions to:
  transmit, to a control plane device that is communicatively coupled to and separated from the forwarding plane device, a request for allocating a first Internet (IP) address to a first user;
  receive, from the control plane device, a response including the first IP address;
  transmit, to the first user, the first IP address to enable the first IP address to be included in a first data packet from the first user;
  receive, from the control plane device, a forwarding rule, wherein the forwarding rule enables the forwarding plane device to forward a second data packet from a second user;
  receive, from the second user, the second data packet comprising an identity of the second user; and
  transmit the second data packet according to the identity and the forwarding rule,
  wherein the identity comprises both a media access control (MAC) address and a virtual local area network (VLAN) identifier.

6. The forwarding plane device of claim 5, wherein the forwarding rule comprises a field for matching the first data packet, and wherein the field comprises a destination IP address.

7. A method, comprising:
 receiving, by a control plane device, a request for allocating a first Internet Protocol (IP) address to a first user;
 allocating, by the control plane device and in response to receiving the request, the first IP address to the first user;
 transmitting, by the control plane device, a response including the first IP address;
 transmitting, by a forwarding plane device to the control plane device, the request, wherein by the forwarding plane device is applied to a broadband remote access server (BRAS) and is communicatively coupled to and separated from the control plane device;
 receiving, by the forwarding plane device and from the control plane device, the response;
 transmitting, by the forwarding plane device and to the first user, the first IP address to enable the first IP address to be included in a first data packet from the first user;

generating, by the control plane device, a forwarding rule, wherein the forwarding rule enables the forwarding plane device to forward a second data packet from a second user;

sending, by the control plane device and to the forwarding plane device, the forwarding rule;

receiving, by the forwarding plane device and from the second user, the second data packet comprising an identity of the second user; and transmitting, by the forwarding plane device, the second data packet according to the identity and the forwarding rule, and wherein the identity comprises both a media access control (MAC) address and a virtual local area network (VLAN) identifier.

8. The method of claim 7, wherein the forwarding rule comprises a field for matching the first data packet, and wherein the field comprises a destination IP address.

9. The method of claim 7, further comprising managing, by the control plane device, a service for a second packet from the first user.

10. The method of claim 9, wherein the service comprises a network address translation (NAT) service.

11. The method of claim 9, wherein the service comprises a carrier-grade network address translation (CGN) service.

12. The method of claim 9, wherein the service comprises an IP Security (IPSEC) service.

13. The method of claim 9, wherein the service comprises a video service.

14. The method of claim 9, wherein the service comprises a firewall service.

15. The method of claim 9, wherein the service comprises a Uniform Resource Locator (URL) filtering service.

16. The method of claim 9, wherein the service comprises a peer-to-peer (P2P) traffic virtualization service.

17. The method of claim 9, further comprising performing, by the control plane device, an operation corresponding to the service to the second packet.

18. The method of claim 9, further comprising forwarding, by the control plane device and to a server capable of performing an operation corresponding to the service, the second packet.

* * * * *